United States Patent [19]
Shimura et al.

[11] Patent Number: 4,896,037
[45] Date of Patent: Jan. 23, 1990

[54] HIGH-SPEED IMAGE RECORDING APPARATUS FOR ENERGY SUBTRACTION PROCESSING

[75] Inventors: Kazuo Shimura; Nobuyoshi Nakajima; Masamitsu Ishida, all of Kanagawa, Japan

[73] Assignee: Fuji Photo Film Co., Ltd., Kanagawa, Japan

[21] Appl. No.: 912,208

[22] Filed: Sep. 25, 1986

Related U.S. Application Data
[63] Continuation of Ser. No. 726755, Apr. 24, 1985.

[30] Foreign Application Priority Data
Apr. 24, 1984 [JP] Japan ................. 59-82350

[51] Int. Cl.$^4$ .................. G21K 3/00; G01T 1/16
[52] U.S. Cl. .................. 250/327.2; 250/484.1; 378/156; 378/157; 378/158
[58] Field of Search .................. 250/327.2, 484.1; 378/5, 8, 156, 157, 158, 160, 172, 173

[56] References Cited
U.S. PATENT DOCUMENTS

| | | | |
|---|---|---|---|
| 3,418,475 | 12/1968 | Hudgens | 378/160 |
| 4,258,264 | 3/1981 | Kotera et al. | 250/484.1 |
| 4,346,295 | 8/1982 | Tanaka et al. | 250/327.2 |
| 4,361,762 | 11/1982 | Douglas | 250/251 |
| 4,399,550 | 8/1983 | Hauck et al. | 378/5 |
| 4,433,428 | 2/1984 | Haendle et al. | 378/95 |
| 4,482,918 | 11/1984 | Keyes et al. | 358/111 |
| 4,564,861 | 1/1986 | Hishinuma et al. | 358/111 |

FOREIGN PATENT DOCUMENTS

| | | | |
|---|---|---|---|
| 587389 | 11/1933 | Fed. Rep. of Germany | 378/156 |
| 36242 | 2/1984 | Japan | 378/172 |

*Primary Examiner*—Constantine Hannaher
*Attorney, Agent, or Firm*—Sughrue, Mion, Zinn, Macpeak & Seas

[57] ABSTRACT

A high-speed image recording apparatus comprises a sheet changer for changing a stimulable phosphor sheet at an image recording position, a radiation source drive controller, and a filter changer for changing a radiation filter on a radiation passage between a radiation source and a stimulable phosphor sheet at each image recording step. The sheet changer, the radiation source drive controller and the filter changer are activated by signals sent from a controller to load the stimulable phosphor sheet to the image recording position, to change over the radiation filter, and then to emit radiation to the stimulable phosphor sheet via an object, thereby recording a high energy image and a low energy image of good energy discrimination in stimulable phosphor sheets.

7 Claims, 2 Drawing Sheets

HIGH-SPEED IMAGE RECORDING APPARATUS FOR ENERGY SUBTRACTION PROCESSING

This is a continuation-in-part, of application Ser. No. 726,755, filed Apr. 24, 1985.

BACKGROUND OF THE INVENTION

1. Field of the Invention

This invention relates to an apparatus for recording original images of an object subjected to digital subtraction processing for radiation images conducted by use of stimulable phosphor sheets. This invention particularly relates to a high-speed image recording apparatus for recording radiation images by quickly changing radiation filters.

2. Description of the Prior Art

Conventionally, a digital subtraction processing method is used for processing radiation images. In the method, two radiation images recorded under conditions different from each other are photoelectrically read out to obtain digital image signals, which are then subjected to subtraction processing with respect to the corresponding picture elements of the images, thereby to obtain a difference signal for forming an image of a specific structure contained in the radiation images. The method makes it possible to reproduce a radiation image of only the specific structure by use of the signal thus obtained.

Basically, subtraction processing is classified into the so-called temporal (time difference) subtraction processing method and the so-called energy subtraction processing method. In the former method, the image of a specific structure is extracted by subtracting the image signal of a radiation image obtained without injection of contrast media from the image signal of a radiation image in which the image of the specific structure is enhanced by the injection of contrast media. In the latter method, an object is exposed to radiations having energy distributions different from each other to obtain two radiation images respectively containing the images of a specific structure recorded on the basis of the intrinsic radiation energy absorption characteristics of the specific structure. Then, the image signals of the two radiation images are weighted appropriately when necessary, and subjected to subtraction to extract the image of the specific structure.

Since subtraction processing is extremely effective for diagnostic purposes in image processings for medical X-ray photographs, it has recently attracted much attention, and research has continued to develop improved methods by use of electronic technology. The processing technique is specifically called the digital subtraction processing method, or more commonly, digital radiography (abbreviated as "DR").

A novel digital subtraction processing method has been proposed, for example, in Japanese Unexamined Patent Publication No. 58(1983)-163340. The method comprises the steps of (i) using two or more stimulable phosphor sheets exhibiting an extremely wide latitude of exposure to a radiation, (ii) exposing the stimulable phosphor sheets to the radiation passing through the same object under different conditions to have radiation images of the object stored in the stimulable phosphor sheets, image information on the specific structure being different between the radiation images, (iii) detecting the radiation images by scanning with stimulating rays to obtain digital image signals, and (iv) conducting digital subtraction processing by use of the digital image signals. The stimulable phosphor sheets comprise a stimulable phosphor which is able to store a part of the radiation energy when exposed to a radiation such as X-rays α-rays, β-rays, γ-rays, cathode rays or ultraviolet rays, and then emits light in proportion to the stored energy of the radiation when exposed to stimulating rays such as visible light, as disclosed for example in U.S. Pat. No. 4,258,264. The stimulable phosphor sheets exhibit an extremely wide latitude of exposure and a markedly high resolving power. Therefore, when the digital subtraction processing is conducted by use of the radiation images stored in the stimulable phosphor sheets, it is possible to obtain a radiation image having an improved image quality, particularly a high diagnostic efficiency and accuracy, regardless of the amount of radiation to which the stimulable phosphor sheets are exposed.

As one of the methods of obtaining two original images subjected to the energy subtraction processing conducted by use of the stimulable phosphor sheets, there has heretofore been known a method wherein the stimulable phosphor sheets are changed quickly at the image recording position and are exposed to a radiation of high energy and a radiation of low energy passing through an object by quickly changing over the tube voltage of an X-ray tube to have radiation images of the object stored in the respective stimulable phosphor sheets. For simplicity, this method is hereinafter called the double exposure method. In the double exposure method, in order to prevent a motion artifact from being generated by an object motion, the two radiation exposure steps are conducted at as short time intervals as possible.

However, when only the tube voltage of the X-ray tube is changed over, energy discrimination between the high energy radiation and the low energy radiation is not sufficient, and an unnecessary portion does not completely disappear or noise increases in a subtraction image obtained by the subtraction processing.

To eliminate the aforesaid problems, it has been proposed to record radiation images via radiation filters transmitting only a radiation having a desired energy range. However, in this case, it takes time to change the radiation filters, and a motion artifact readily arises.

SUMMARY OF THE INVENTION

The primary object of the present invention is to provide a high-speed image recording apparatus which records a high energy image and a low energy image of good energy discrimination by use of radiation filters.

Another object of the present invention is to provide a high-speed image recording apparatus which records a high energy image and a low energy image at very short time intervals.

The present invention provides a high-speed image recording apparatus for an energy subtraction processing, which comprises:

(i) a sheet change means for removing a stimulable phosphor sheet positioned at a predetermined image recording position from said image recording position and loading a different stimulable phosphor sheet to said image recording position, (ii) a radiation source for emitting a radiation to said stimulable phosphor sheet positioned at said image recording position, (iii) a radiation source drive controlling means for controlling drive of said radiation source, (iv) a filter change-over means for changing over a different radiation filter on a radiation passage between said radiation source and said stimulable phosphor sheet at each image recording step, and (v) a controller for sending signals to said sheet change means, said filter change-over means and said radiation source drive controlling means for loading said stimulable phosphor sheet to said image recording position by said sheet change means, changing over said radiation filter by said filter change-over means, and then driving said radiation source by said radiation source drive controlling means to emit said radiation.

In the present invention, it is possible to obtain a high energy image and a low energy image of good energy discrimination by automatically changing over the radiation filter at very short time intervals. Therefore, it becomes possible to form a noise-free subtraction image in which an unnecessary portion is erased completely and which has an improved image quality, particularly a high diagnostic efficiency and accuracy. Also, since original radiation images are recorded very quickly, generation of a motion artifact is prevented securely.

DESCRIPTION OF THE PREFERRED EMBODIMENTS

The present invention will hereinbelow be described in further detail with reference to the accompanying drawings.

Figure 1:
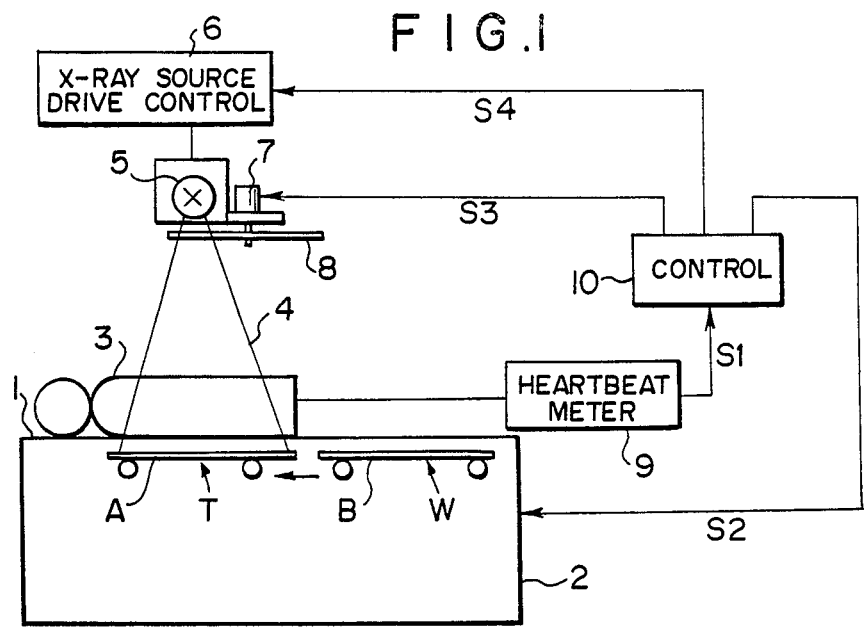
FIG. 1 is a schematic view showing the configuration of an embodiment of the high-speed image recording apparatus in accordance with the present invention.
Figure 2:
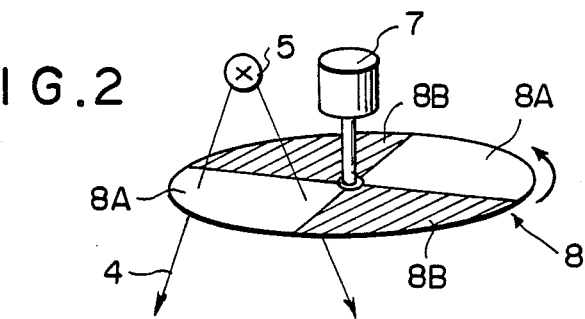
FIG. 2 is a perspective view showing the radiation filters used in the embodiment of FIG. 1.

In FIG. 1, a sheet changer 2 is provided with an image recording table 1 at the upper portion, and a stimulable phosphor sheet A is positioned at an image recording position T standing face to face with an object 3 with the image recording table 1 intervening therebetween. The sheet changer 2 removes the stimulable phosphor sheet A from the image recording position T and moves a stimulable phosphor sheet B in a waiting position W to the image recording position T. Thus the sheet changer 2 sequentially loads unexposed stimulable phosphor sheets to the image recording position T. An X-ray source 5 for emitting X-rays 4 to the stimulable phosphor sheet A at the image recording position T is positioned above the image recording table 1. The tube voltage of the X-ray source 5 is adjusted to a desired value by an X-ray source drive controller 6. An X-ray filter plate 8 switchable by a filter changeover device 7 is positioned in the path of the X-rays 4 between the X-ray source 5 and the object 3. As shown in FIG. 2, the X-ray filter plate 8 is provided with a high energy range pass filter 8A fabricated of a copper plate or the like and a low energy range pass filter 8B fabricated of La, Y or the like and generally called a K edge filter. The X-ray filter plate 8 is rotated by the filter change-over device 7 so that one of the high energy range pass filter 8A and the low energy range pass filter 8B is selectively positioned on the passage of the X-rays 4 at each image recording step.

Heartbeats of the object 3 are detected by a heartbeat meter 9, and a heartbeat signal S1 generated by the heartbeat meter 9 is sent to a controller 10. The controller 10 sends a sheet change signal S2, a filter change-over signal S3 and an X-ray emission signal S4 respectively to the sheet changer 2, the filter changeover device 7 and the X-ray source drive controller 6.

The apparatus shown in FIG. 1 is operated as described below. When the object 3 lies at a predetermined position on the image recording table 1 and an image recording start signal is manually entered to the controller 10, the controller 10 sends the sheet change signal S2 and the filter change-over signal S3 respectively to the sheet changer 2 and the filter change-over device 7 to move the stimulable phosphor sheet A to the image recording position T and to position the high energy range pass filter 8A on the passage of the X-rays 4. The aforesaid operations may be conducted before the object 3 lies on the image recording table 1 or may be conducted manually without using the controller 10.

Thereafter, the controller 10 sends the X-ray emission signal S4 to the X-ray source drive controller 6 in synchronization with the predetermined heartbeat timing on the basis of the heartbeat signal S1 and drives the X-ray source 5 at a comparatively high tube voltage, for example, at 120 kVp. The X-rays 4 of comparatively high energy thus emitted pass through the high energy range pass filter 8A, and X-rays of a comparatively low energy range contained in the X-rays 4, if any, are cut off by the filter 8A. In this manner, an X-ray image of the object is stored in the stimulable phosphor sheet A only by the X-rays 4 of a comparatively high energy range.

After the high energy image is stored in the stimulable phosphor sheet A, the controller 10 sends the sheet change signal S2 to the sheet changer 2 to remove the stimulable phosphor sheet A from the image recording position T and moves the next stimulable phosphor sheet B to the image recording position T. At the same time, the controller 10 sends the filter change-over signal S3 to the filter change-over device 7 to position the low energy range pass filter 8B instead of the high energy range pass filter 8A on the X-ray passage. Then, the controller 10 sends the X-ray emission signal S4 to the X-ray source drive controller 6 at the same timing as the predetermined heartbeat timing to drive the X-ray source 5 at a comparatively low tube voltage, for example, at 60 kVp. Thus an X-ray image of the object 3 is stored in the stimulable phosphor sheet B only by the X-rays 4 of the low energy range passing through the filter 8B.

In the images stored as described above in the stimulable phosphor sheets A and B, the image information on a specific structure of the object 3 differs since the specific structure exhibits inherent X-ray energy absorption characteristics. A subtraction processing for extracting the image of the specific structure will be briefly described below.

Figure 3:
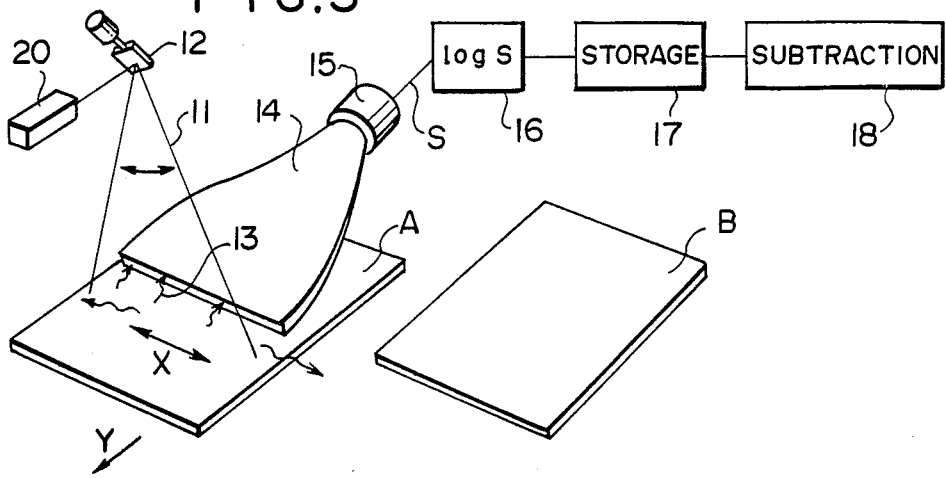
FIG. 3 is a schematic view showing the step of reading out radiation images from stimulable phosphor sheets carrying out the radiation images stored therein.

From the stimulable phosphor sheets A and B carrying the X-ray images stored therein, the X-ray images are read out by use of an image read-out means as shown in FIG. 3 to obtain digital image signals representing the X-ray images. First, while the stimulable phosphor sheet A1 is moved in the direction as indicated by the arrow Y to conduct sub-scanning, a laser beam 11 emitted by a laser beam source 20 is deflected in the direction as indicated by the arrow X by a scanning mirror 12 to conduct main scanning. In this manner, the stimulable phosphor sheet A is caused to release the X-ray energy stored therein as light 13 in proportion to the X-ray energy. The emitted light 13 enters a light guide member 14, which is made by forming a transparent acrylic sheet, from one end face thereof. The light guide member 14 may be of a shape and a material as disclosed in U.S. Pat. No. 4,346,295. The light 13 is then guided through total reflection inside of the light guide member 14 up to a photomultiplier 15, and the amount of the light 13 is outputted as an image signal S by the photomultiplier 15. The image signal S is then converted into a digital image signal logSA of a logarithmic value (logS) by a log-converter 16 comprising an amplifier and an A/D converter. The digital image signal logSA is stored in a storage medium 17 such as a magnetic tape. Thereafter, the X-ray image stored in the other stimulable phosphor sheet B is read out therefrom in exactly the same manner as described above, and digital image signal logSB thus obtained is stored in the storage medium 17.

Thereafter, a subtraction processing is conducted by use of the digital image signals logSA and logSB obtained as described above. First, the digital image signals logSA and logSB are read respectively from the storage medium 17, and are sent to a subtraction operation circuit 18. The subtraction operation circuit 18 weights the digital image signals logSA and logSB obtained as described above by use of weight factors a and b, and conducts a subtraction processing between the digital image signals logSA and logSB with respect to the corresponding picture elements to obtain a digital difference signal Ssub as expressed by $$S_{sub} = a \cdot \log S_A - b \cdot \log S_B + C$$

where a, b and c are constants. The constant c is a bias component for adjusting the density of the difference signal Ssub approximately to a predetermined value.

Figure 4:
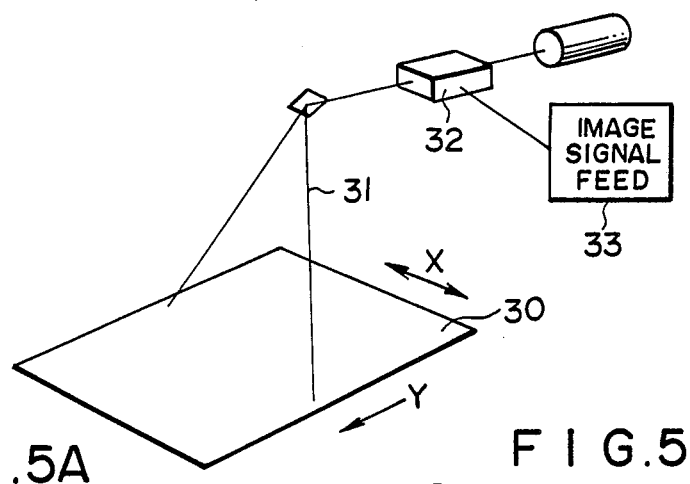
FIG. 4 is a schematic view showing an example of the subtraction image reproducing system.

The difference signal Ssub is subjected to a signal processing such as a gradation processing, and is then sent to an image reproducing apparatus, for example, a display device such as a cathode ray tube (CRT) or a point-by-point scanning apparatus which reproduces a subtraction image by use of the difference signal Ssub. FIG. 4 shows an apparatus for reproducing the image by point-by-point scanning as an example of the subtraction image reproducing system. A photosensitive film 30 is moved in the sub-scanning direction as indicated by the arrow Y, and at the same time a laser beam 31 is deflected onto the photosensitive film 30 in the main scanning direction as indicated by the arrow X. The laser beam 31 is modulated by an A/O modulator 32 with an image signal sent from an image signal feeder 33, thereby to form a visible image on the photosensitive film 30. By using the difference signal Ssub as the modulating image signal, it is possible to reproduce a visible image, wherein only the specific structure is extracted by the digital subtraction processing, on the photosensitive film 30.

The two original images subjected to the energy subtraction processing, i.e. the high energy image stored in the stimulable phosphor sheet A and the low energy image stored in the stimulable phosphor sheet B, are recorded by the X-rays of energy ranges separated securely from each other by the action of the high energy range pass filter 8A and the low energy range pass filter 8B. Therefore, in the obtained subtraction image, an unnecessary image portion is securely erased and the level of noise is low.

The X-ray exposure operation is not limited to the sequence of the high energy X-rays and the low energy X-rays, and may be of the sequence of the low energy X-rays and the high energy X-rays.

Further, since the change of the stimulable phosphor sheets A and B, change-over of the filters 8A and 8B, and the intermittent activation of the X-ray source 5 can be conducted within approximately 0.3 second, it is possible to record the high energy image and the low energy image between two consecutive heartbeats, and to record the original images exhibiting no motion artifact after the subtraction processing.

Figure 5A:
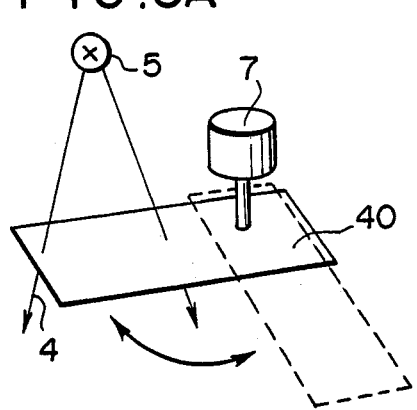
FIGS. 5A and 5B are perspective views showing further examples of the radiation filters and the filter change-over means used in the apparatus of the present invention.
Figure 5B:
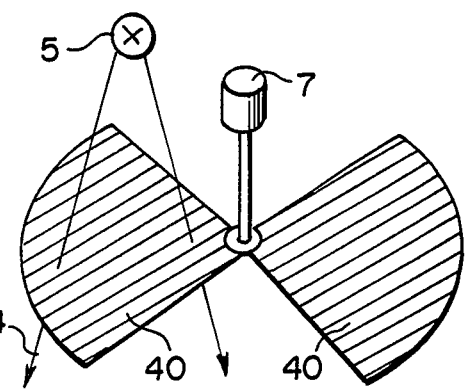
Figure 6:
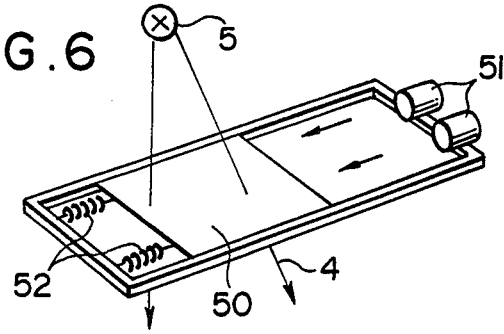
FIG. 6 is a perspective view showing still further examples of the radiation filters and the filter change-over means used in the apparatus of the present invention.

When materials exhibiting high energy discrimination capacity are used as the high energy range pass filter 8A and the low energy rage pass filter 8B, it becomes possible to obtain the high energy image and the low energy image without changing the tube voltage of the X-ray source 5. Also, instead of using the radiation filters for high energy range pass and low energy range pass, only one of them may be used. In this case, in general, the high energy range pass filter should preferably be used instead of the low energy range pass filter. This is because the effect of the filter fabricated of Cu or the like on removal of low energy X-ray from X-rays emitted at high tube voltage is larger than the effect of the K edge filter fabricated of La, Y or the like on removal of high energy X-rays from X-rays emitted at low tube voltage. When only one of the high energy range pass filter and the low energy range pass filter is used, it is possible to use a radiation filter 40 as shown in FIG. 5A which can be rotated by 90° by the filter change-over device 7, or a radiation filter 40 as shown in FIG. 5B which can be rotated by the filter change-over device 7 to 0°, 90°, 180° and 270° positions. It is also possible to use a slidable radiation filter 50 as shown in FIG. 6 which is attracted by an electromagnet 51 and removed from the radiation passage at the first image recording step and is pulled by a spring 52 and is positioned on the radiation passage at the second image recording step when the electromagnet 51 is demagnetized.

As described above, the present invention embraces the case where only one type of the radiation filter is used. Accordingly, when only one type of the radiation filter is used, the term "changing over a different radiation filter on a radiation passage at each image recording step" as used herein means that the condition of the filter positioned on the radiation passage and the condition of the filter absent on the radiation passage are switched at each image recording step.

Also, in the present invention, radiation exposure need not necessarily be synchronized with heartbeats of the object. However, radiation exposure should preferably be synchronized with the heartbeats since generation of a motion artifact caused by the heartbeats is prevented.

Image recording in synchronization with the heartbeats may be conducted also by driving the radiation source by a synchronizing signal obtained from the heartbeat signal and sending the filter change-over signal and the sheet change signal respectively to the radiation filter change-over device and the sheet changer at timing after the synchronizing signal, thereby changing over the filter and the stimulable phosphor sheet.

Further, the position of the radiation filter is not limited to the position on the X-ray passage between the X-ray source and the object. Thus the radiation filter may be positioned on the X-ray passage between the object and the stimulable phosphor sheet. However, in order to decrease the radiation dose to the object and the size of the radiation filter, the radiation filter should preferably be positioned between the X-ray source and the object, and should more preferably be positioned close to the X-ray source as shown in FIG. 1.

We claim:

1. A high-speed image recording apparatus for energy subtraction processing, which comprises:
   (i) sheet change means for removing a stimulable phosphor sheet positioned at a predetermined image recording position from said image recording position and loading a different stimulable phosphor sheet to said image recording position;
   (ii) a radiation source for emitting a radiation to said stimulable phosphor sheet positioned at said image recording position;
   (iii) radiation source drive controlling means for controlling drive of said radiation source;
   (iv) filter change-over means for changing over a different radiation filter on a radiation passage between said radiation source and said stimulable phosphor sheet at each image recording step, and
   (v) a controller for sending signals to said sheet change means, said filter change-over means and said radiation source drive controlling means for loading said stimulable phosphor sheet to said image recording position by said sheet change means, changing over said radiation filter by said filter change-over means, and then driving said radiation source by said radiation source drive controlling means to emit said radiation, wherein said controller sends a signal to said radiation source drive controlling means in synchronization with consecutive heartbeats of an object.

2. An apparatus as defined in claim 1 wherein said radiation filter comprises a high energy range pass filter and a low energy range pass filter.

3. An apparatus as defined in claim 2 wherein each of said high energy range pass filter and said low energy range pass filter comprises two kinds of sectors positioned so that one sector of said high energy range pass filter is adjacent to one sector of said low energy range pass filter.

4. An apparatus as defined in claim 1 wherein said radiation filter is constituted only by a high energy range pass filter.

5. An apparatus as defined in claim 4 wherein said radiation filter is rectangular and is rotatable by 90° to and away from said radiation passage.

6. An apparatus as defined in claim 4 wherein said radiation filter comprises two sections each rotatable to 0°, 90°, 180° and 270° positions.

7. An apparatus as defined in claim 4 wherein said radiation filter is slidable to and away from said radiation passage, and said filter change-over means comprises an electromagnet and a spring for sliding said radiation filter.

* * * * *